US010560702B2

(12) United States Patent
Zhang et al.

(10) Patent No.: US 10,560,702 B2
(45) Date of Patent: Feb. 11, 2020

(54) TRANSFORM UNIT SIZE DETERMINATION FOR VIDEO CODING

(71) Applicant: INTEL CORPORATION, Santa Clara, CA (US)

(72) Inventors: Ximin Zhang, San Jose, CA (US); Sang-Hee Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 15/004,779

(22) Filed: Jan. 22, 2016

(65) Prior Publication Data

US 2017/0214913 A1    Jul. 27, 2017

(51) Int. Cl.
*H04N 19/176* (2014.01)

(52) U.S. Cl.
CPC .................... *H04N 19/176* (2014.11)

(58) Field of Classification Search
CPC .... H04N 19/115; H04N 19/13; H04N 19/137; H04N 19/176
See application file for complete search history.

(56) References Cited

U.S. PATENT DOCUMENTS

| 2003/0035477 | A1 | 2/2003 | Sekiguchi et al. |
| 2011/0243249 | A1* | 10/2011 | Lee ..................... H04N 19/176 375/240.25 |
| 2013/0028326 | A1 | 1/2013 | Moriya et al. |
| 2013/0136175 | A1* | 5/2013 | Wang ................... H04N 19/176 375/240.12 |
| 2013/0188727 | A1 | 7/2013 | Lou et al. |
| 2013/0235925 | A1 | 9/2013 | Nguyen et al. |
| 2014/0226721 | A1* | 8/2014 | Joshi ..................... H04N 19/159 375/240.13 |
| 2015/0023414 | A1 | 1/2015 | Han et al. |
| 2015/0055697 | A1* | 2/2015 | Wu ........................ H04N 19/176 375/240.02 |
| 2015/0103918 | A1 | 4/2015 | Wang et al. |
| 2015/0256853 | A1 | 9/2015 | Li et al. |
| 2016/0156911 | A1 | 6/2016 | Mitasaki et al. |
| 2016/0261870 | A1* | 9/2016 | Tu .......................... H04N 19/14 |

FOREIGN PATENT DOCUMENTS

| EP | 3026909 | 6/2016 |
| WO | 2015012253 | 1/2015 |
| WO | 2015099823 | 7/2015 |

OTHER PUBLICATIONS

International Preliminary Report on Patentability for International Patent Application No. PCT/US16/65203, dated Aug. 2, 2018.
International Search Report and Written Opinion for International Patent Application No. PCT/US2016/065203, dated Mar. 17, 2017.
European Search Report for EP Application No. 16886782.8, dated Mar. 5, 2019.

* cited by examiner

*Primary Examiner* — Christopher G Findley
(74) *Attorney, Agent, or Firm* — Green, Howard & Mughal LLP

(57) ABSTRACT

Techniques related to transform unit size determination for video coding are discussed. Such techniques may include comparing individual prediction residues of a unit of a picture of video such as a coding unit to an adaptive threshold and splitting a transform unit corresponding to the unit if any of the prediction residues exceed the adaptive threshold.

21 Claims, 8 Drawing Sheets

TRANSFORM UNIT SIZE DETERMINATION FOR VIDEO CODING

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In some video standards, the transform unit is an important feature for compression efficiency and quality. For example, the high efficiency video coding (HEVC) standard defines coding units (CUs) as picture sub-partitions having variable sizes. HEVC also defines prediction units (PUs) and transform units (TUs) that specify how a given coding unit is to be partitioned for prediction and transform purposes, respectively. After intra or inter prediction, transform operations are applied on residual bocks to generate transform coefficients, which are quantized, scanned, and entropy encoded into a bitstream.

The transform units may thereby allow a coding unit to use a smaller transform size and support transform sizes from, for example, 4×4 to 32×32. Although discussed with respect to HEVC, other coding standards such as VP9 use similar features. An optimal or near optimal selection of transform unit sizes may bring about large subjective and objective improvements in the coding processing. Currently, the selection of transform unit sizes may require brute force rate distortion based transform unit size selections, which is based on multiple pass coding for each available transform unit size. However, the complexity of such brute force selection techniques may not be feasible in many implementations.

It may be advantageous to select transform unit sizes with efficiency and high quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
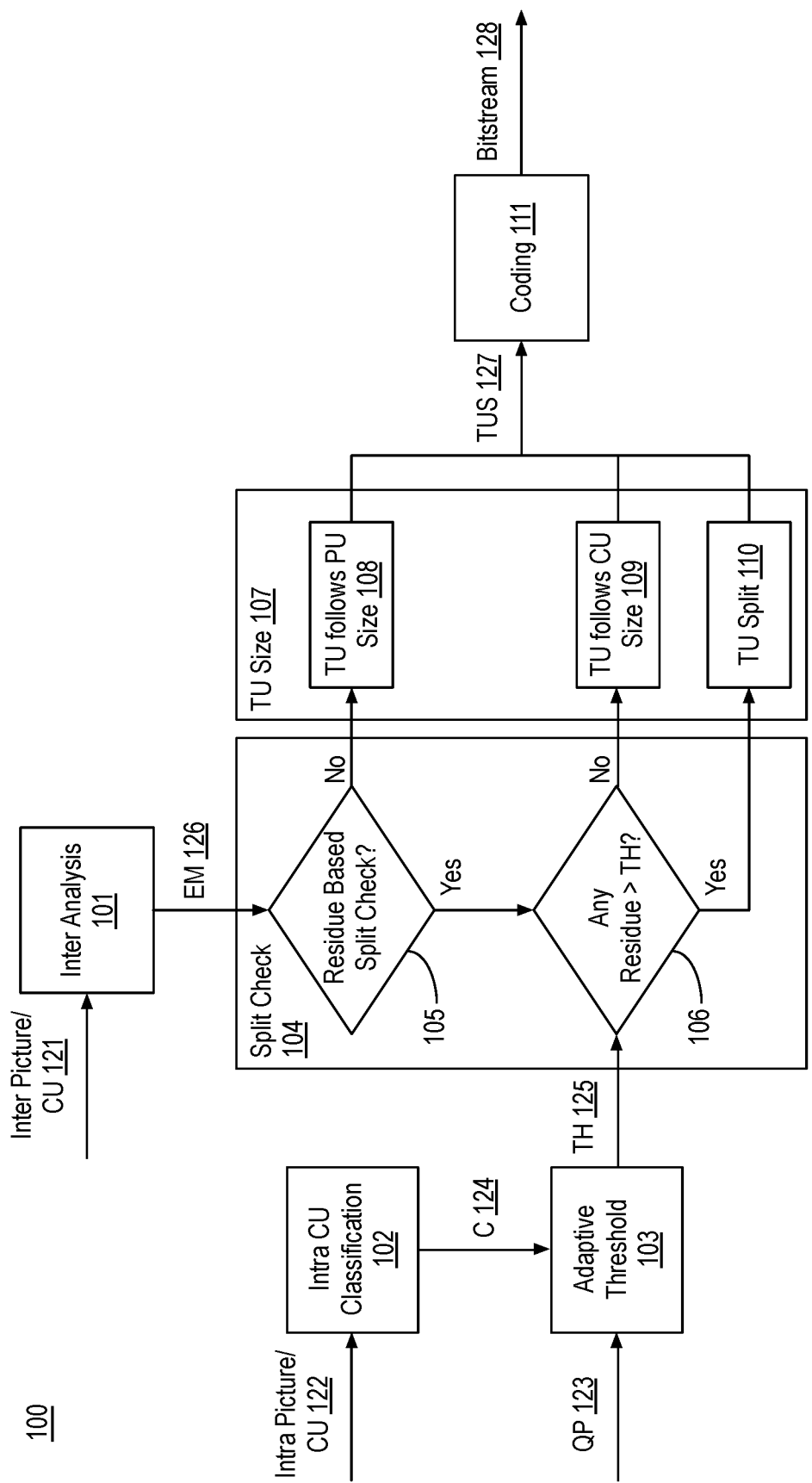
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to transform unit size determination for video coding.

As described above, selection of transform unit sizes is an important feature for compression efficiency and quality. As discussed, HEVC defines coding units as picture sub-partitions having variable sizes and prediction units and transform units that specify how a given coding unit is to be partitioned for prediction and transform purposes, respectively. For example, after intra or inter prediction, transform operations are applied on residual bocks according to the selected transform unit sizes to generate transform coefficients, which are quantized, scanned, and entropy encoded into a bitstream.

In some embodiments discussed herein, transform unit sizes may be determined after a unit such as a coding unit size is selected. For example, individual prediction residues of the unit may be compared to an adaptive transform unit split threshold corresponding to the unit. The adaptive transform unit split threshold may be determined based on the content of the unit (e.g., intra classification or inter analysis, as is discussed further herein) and/or the quantization parameter corresponding to the unit. Furthermore, prior to the comparison of the prediction residues of the unit to the adaptive transform unit split threshold, a determination may be made as to whether such split checking (e.g., the comparison) may be skipped for the particular unit. For example, in the context of inter units, such skipping may be provided when the unit is 8×8 pixels and/or when the unit is deemed to have excess motion such as random motion or motion blur or the like. In the context of intra units, such skipping may not be applied and the split checking may be applied to all intra units.

Based on the comparison of the prediction residues of the unit to the adaptive transform unit split threshold, multiple transform units may be provided for the coding unit. For example, a transform unit split may be performed if any of the prediction residues of the unit exceed the adaptive transform unit split threshold. If none of the prediction residues of the unit exceed the adaptive transform unit split threshold, no split may be applied and the transform unit size may follow the prediction unit size or the unit (e.g., the coding unit) size depending on coding context. The picture may then be coded based on the multiple transform units for the unit and transform unit sizes as selected for all units of the picture to generate a bitstream including the coded picture.

Such techniques may be applied to both intra and inter coding units or to intra coding units only or inter coding units only. Furthermore, such techniques may be selectively applied based on frame type, coding application, user selection, or the like. Using the techniques discussed herein, brute force transform unit size selection may be avoided providing increased computational efficiency. As is discussed further herein, the transform unit size decision techniques may be based on coding unit classification (e.g., for intra units), inter analysis (e.g., for inter units), quantization parameter adaptive threshold generation, and prediction residue adaptive split decisions.

For example, in the context of intra units, the units may be classified into one of a set of classes and a quantization parameter based threshold may be determined for each class. The prediction residuals for the intra unit may then be compared to the adaptive threshold generated for the class into which the intra unit was classified to make the transform unit split decision. If any of the residuals exceed the threshold a transform unit split may be applied and, if not, no transform unit split may be applied.

In the context of inter units, inter analysis may be performed for the units to detect excess motion such as motion blur, irregular motion, or random motion and if such motion is detected, the transform unit split decision may be skipped (and the transform unit size may follow the prediction unit size for the unit). If the transform unit split decision is applied (e.g. not skipped), the prediction residuals for the inter unit may then be compared to an adaptive threshold. If any of the residuals exceed the threshold a transform unit split may be applied and, if not, no transform unit split may be applied. The discussed adaptive threshold may be characterized as a threshold, an adaptive transform unit split threshold, an adaptive prediction residual based transform unit split threshold, or the like.

Such techniques may provide low computational complexity and reduced implementation footprint as brute force transform unit size selections are avoided.

FIG. 1 is an illustrative diagram of an example system 100 for providing video coding, arranged in accordance with at least some implementations of the present disclosure. As shown in FIG. 1, system 100 may include an inter analysis module 101, an intra coding unit (CU) classification module 102, an adaptive threshold module 103, a split check module 104, a transform unit size module 107, and a coding module 111. Also as shown, split check module 104 may include a split check skip module 105 (e.g., labeled Residue Based Split Check?) and a prediction residue comparison module 106 (e.g., labeled Any Residue>TH?). Furthermore, transform unit size module 107 may include a transform unit (TU) follows prediction unit (PU) size module 108, a transform unit (TU) follows coding unit (CU) size module 109, and a transform unit split module 110.

Also as shown, inter analysis module 101 may receive inter pictures or inter coding units (Inter Picture/CU) 121, intra coding unit classification module 102 may receive intra pictures or intra coding units (Intra Picture/CU) 122, and adaptive threshold module 103 may receive quantization parameters (QP) 123. For example, system 100 may receive video (not shown) and system 100 may provide video compression such that system 100 may be a video encoder implemented via a computer or computing device or the like. For example, system 100 may receive video including a sequence of pictures and system may assign picture types to such pictures, partition such pictures into coding units and/or prediction units, perform inter and/or inter prediction to generate prediction residues, and the like, and system 100 may generate a bitstream 128 that is compatible with a video compression-decompression (codec) standard such as the high efficiency video coding (HEVC) standard, the VP9 standard, or the like. System 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

System 100 may include other modules or components not shown for the sake of clarity of presentation. For example, system 100 may include a partition module, a transform module, a quantization module, an intra prediction module, a motion estimation module, a motion compensation module, an in-loop filtering module, a reference picture buffer, a scanning module, or the like. In some examples, system 100 may include a local decode loop for generating reference pictures used in the encoding process. Such modules are known to those of skill in the art and are not discussed further herein for the sake of clarity in presenting the described techniques.

As discussed, system may receive video (not shown). Such video may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), or 4K resolution video, or the like, and the video may include any number of video frames, sequences of video frames, pictures, groups of pictures, or the like. Techniques discussed herein are discussed with respect to pictures, coding units, prediction units, and transform units for the sake of clarity of presentation. However, such pictures and groups of pictures may be characterized as frames, video frames, sequences of frames, video sequences, or the like, and such coding units, prediction units, and transform units may be characterized as units, blocks, macroblocks, sub-units, sub-blocks, or the like.

As discussed, intra coding unit classification module 102 may receive intra pictures or intra coding units 122. Intra pictures or intra coding units 122 may include any suitable data representative of intra pictures or intra coding units such as pixel data, prediction residual data, picture or coding unit size and/or partition data, prediction unit size and/or partition data, or the like. As shown, intra coding unit classification module 102 may determine, for each coding unit received via intra pictures or intra coding units 122 a classification (C) 124. Intra coding unit classification module 102 may implement any number of intra coding unit classifications and intra coding unit classification module 102 may classify coding units into a particular classification using any suitable technique or techniques.

For example, intra coding unit classification module 102 may implement three classes. A first class (e.g., Class 1) may provide for a classification for or represent coding units (or units or blocks or the like) having sharp edges such as screen content, content having letters, or image or nature structures having clean edges. For example, the first class may be characterized as a sharp edge content class, an edge content class, a text and/or graphics content class, or the like. A second class (e.g., Class 2) may provide for classification for or represent coding units (or units or blocks or the like) having texture such as texture units or texture blocks such that texture content does not have dominant directional edges. For example, the second class may be characterized as a texture content class, a non-dominant directional edge content class, or the like. A third class (e.g., Class 3) may provide for classification for or represent all other coding units (or units or blocks or the like). For example, the third class may be characterized as a remainder class or the like. Intra coding unit classification module 102 may classify coding units into such classes using any suitable technique or techniques.

Figure 2:
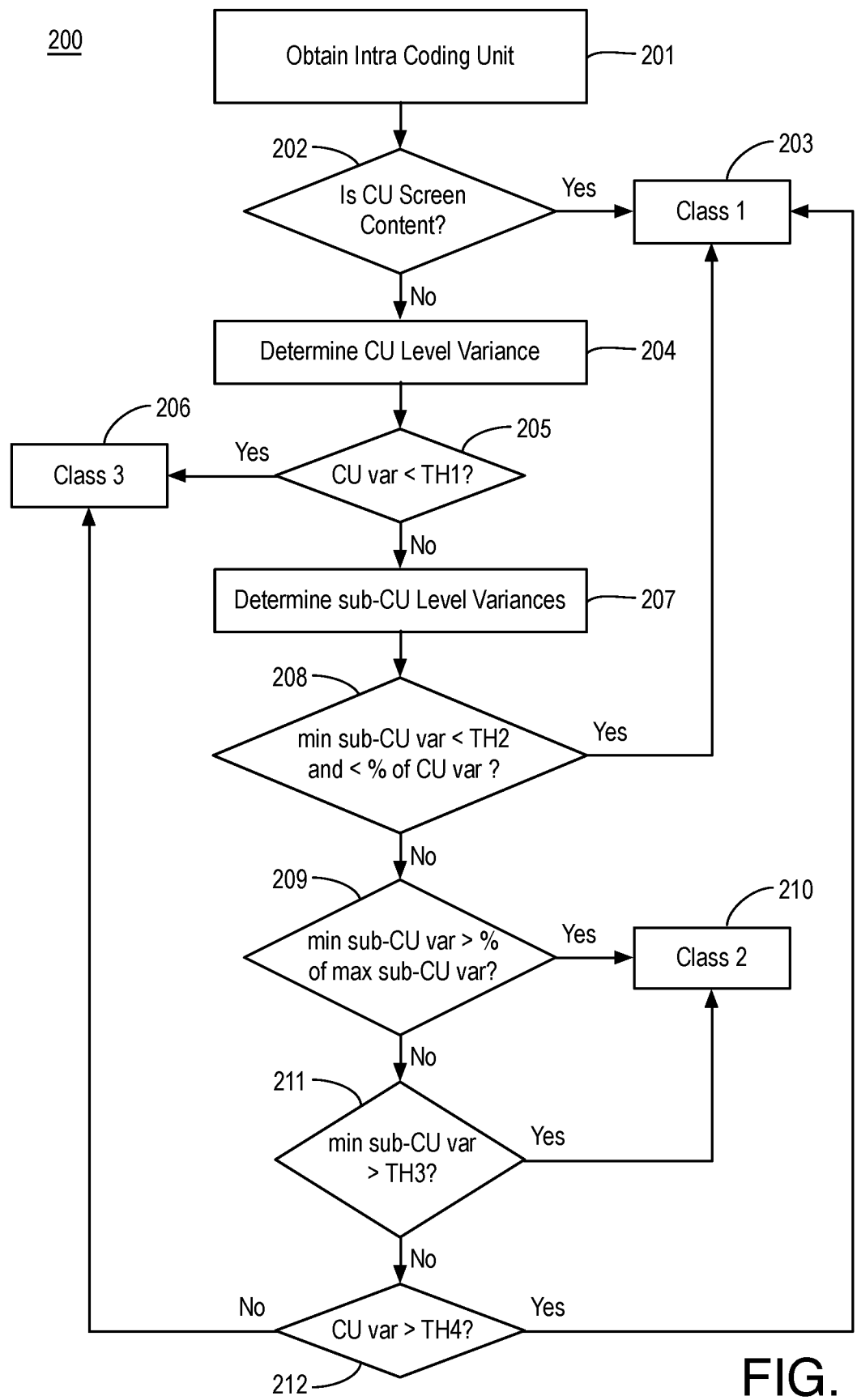
FIG. 2 is a flow diagram illustrating an example process for classifying an intra coding unit.

FIG. 2 is a flow diagram illustrating an example process 200 for classifying an intra coding unit, arranged in accordance with at least some implementations of the present disclosure. Process 200 may include one or more operations 201-212 as illustrated in FIG. 2. Process 200 may be performed by a device (e.g., system 100 as discussed herein) to classify an intra coding unit. Process 200 may be performed at a coding unit level or a picture level process 200 may be repeated, in series or in parallel, for any number of coding units or pictures or the like.

Process 200 may begin at operation 201, where an intra coding unit and/or an intra picture may be obtained. The intra coding unit or an intra picture may be generated or obtained using any suitable technique or techniques. For example, system 100 may assign a picture as an intra picture or a picture having intra units and system 100 may partition the picture into coding units including the intra coding unit.

Processing may continue at decision operation 202, where a determination may be made as to whether the intra coding unit (CU) is screen content. The determination of the coding unit or picture including the coding unit being screen content may be made using any suitable technique or techniques. For example, an indicator that the coding unit or picture including the coding unit is screen content may be received from an application providing the video. In other examples, content analysis techniques may be used to determine the coding unit or picture including the coding unit is screen content. As shown, if the coding unit is screen content, processing may continue at operation 203, where the coding unit may be classified in Class 1 (e.g., a sharp edge content class).

If the intra coding unit (or picture) is not screen content, processing may continue at operation 204, where an intra coding unit (CU) level variance may be determined. The intra coding unit level variance may be determined using any suitable technique or techniques. For example, the intra coding unit level variance may be an average squared deviation from an average of pixel values or residual pixel values for the intra coding unit. Although discussed with respect to variance, any measure of the spread of the pixel values or residual pixel values of the coding units may be used at operations 204 and 207.

Processing may continue at decision operation 205, where a determination may be made as to whether the intra coding unit level variance (CU var) is less than (or less than or equal) a first threshold (TH1). The first threshold may be any suitable threshold. In an embodiment, the first threshold may be preselected or empirically selected to classify coding units into Class 3 (e.g., a remainder class). As shown, if the intra coding unit level variance is less than (or less than or equal) the first threshold, processing may continue at operation 206, where the coding unit may be classified in Class 3 (e.g., a remainder class).

If the intra coding unit level variance is not less than (or exceeds) the first threshold, processing may continue at operation 207, where sub-intra coding unit (sub-CU) level variances may be determined for the intra coding unit. The sub-intra coding unit level variances may be determined using any suitable technique or techniques. For example, sub-intra coding units may be any number of partitions or divisions of the intra coding unit. In an embodiment, the sub-intra coding units may be generated by dividing the intra coding unit into four equal sized sub-intra coding units. A variance for each sub-intra coding unit may then be determined as discussed with respect to operation 204. For example, each sub-intra coding unit level variance may be an average squared deviation from an average of pixel values or residual pixel values for the sub-intra coding unit.

Processing may continue at decision operation 208, where a determination may be made as to whether a minimum sub-intra coding unit level variance (min sub-CU var) is less than (or less than or equal) a second threshold (TH2) and the minimum sub-intra coding unit level variance is less than (or less than or equal) a percentage of the coding unit variance (CU var) as determined at operation 204. The second threshold may be any suitable threshold and the percentage may be any suitable percentage or fraction. In an embodiment, the second threshold and the percentage may be preselected or empirically selected to classify coding units into Class 1 (e.g., a sharp edge content class). In an embodiment, the percentage is 10%. As shown, if the minimum sub-intra coding unit level variance is less than (or less than or equal) the second threshold and the minimum sub-intra coding unit level variance is less than (or less than or equal) the percentage of the coding unit variance, processing may continue at operation 203, where the coding unit may be classified in Class 1 (e.g., a sharp edge content class).

If the minimum sub-intra coding unit level variance is not less than (or exceeds) the second threshold or the percentage of the coding unit variance, processing may continue at decision operation 209, where a determination may be made as to whether the minimum sub-intra coding unit level variance (min sub-CU var) is greater than (or greater than or equal) a percentage of a maximum sub-intra coding unit level variance (max sub-CU var). The percentage may be any suitable percentage or fraction. In an embodiment, the percentage may be preselected or empirically selected to classify coding units into Class 2 (e.g., a texture content class). In an embodiment, the percentage is 50%. As shown, if the minimum sub-intra coding unit level variance is greater than (or greater than or equal) the percentage of the maximum sub-intra coding unit level variance, processing may continue at operation 210, where the coding unit may be classified in Class 2 (e.g., a texture content class).

If the minimum sub-intra coding unit level variance is not greater than the percentage of the maximum sub-intra coding unit level variance, processing may continue at decision operation 211, where a determination may be made as to whether the minimum sub-intra coding unit level variance (min sub-CU var) is greater than (or greater than or equal) a third threshold. The third threshold may be any suitable threshold. In an embodiment, the third threshold may be preselected or empirically selected to classify coding units into Class 2 (e.g., a texture content class). As shown, if the minimum sub-intra coding unit level variance is greater than (or greater than or equal) the third threshold, processing may continue at operation 210, where the coding unit may be classified in Class 2 (e.g., a texture content class).

If the minimum sub-intra coding unit level variance is not greater than the third threshold, processing may continue at decision operation 212, where a determination may be made as to whether the coding unit variance (CU var) is greater than (or greater than or equal) a fourth threshold. The fourth threshold may be any suitable threshold. In an embodiment, the fourth threshold may be preselected or empirically selected to classify coding units into Class 1 (e.g., a sharp edge content class). As shown, if the coding unit variance is greater than (or greater than or equal) the fourth threshold, processing may continue at operation 203, where the coding unit may be classified in Class 1 (e.g., a sharp edge content class). If not, processing may continue at operation 206, where the coding unit may be classified in Class 3 (e.g., a remainder class).

For example, as discussed with respect to FIG. 2, a coding unit level variance and sub-coding unit level variances such as the variances of four sub-coding units may be used to classify the coding unit. In an embodiment, the sub-coding units may be generated by dividing the coding unit into four equal sized sub-coding units. The coding unit level variance and sub-coding unit level variances may be determined using any suitable technique or techniques and, although discussed with respect to variance, any measure of the spread of the pixel values of the coding units and/or sub-coding units may be used. The variances may be determined as needed (as shown with respect to FIG. 2) or they may be determined prior to beginning the classification process.

In an embodiment, classification of an intra CU may be performed as follows. If the CU (or the picture including the CU) is screen content, the CU is classified in Class 1 (e.g., a sharp edge content class). Otherwise, if the CU level variance is less than a threshold-1, the CU is classified into Class 3 (e.g., a remainder class). Otherwise, four sub-CU variances may be determined and used to classify the coding unit. For example, if a minimum sub-CU variance is less than a threshold-2 and less than a percentage (e.g., 10%) of the CU level variance, the CU is classified in Class 1 (e.g., a sharp edge content class). Otherwise, if the minimum sub-CU variance is greater than a percentage (e.g., 50%) of a maximum sub-CU variance, the CU is classified in Class 2 (e.g., a texture content class). Otherwise, if the minimum sub-CU variance greater than a threshold-3, the CU is classified in Class 2 (e.g., a texture content class). Otherwise, if the CU level variance is greater than a threshold-4, the CU is classified in Class 1 (e.g., a sharp edge content class). Otherwise, the CU is classified in Class 3 (e.g., a remainder class).

Returning to FIG. 1, as shown, adaptive threshold module 103 may receive quantization parameters 123 such that quantization parameters 123 are associated with intra pictures or intra coding units 122. Adaptive threshold module 103 may also receive classifications 124 associated with intra coding units of intra pictures or intra coding units 122. For example, classifications 124 may include any suitable signal or indicators or the like indicating which class each intra coding unit has been classified to, assigned to, or corresponds with, or the like. Adaptive threshold module 103 may generate an adaptive threshold 125 for each of intra pictures or intra coding units 122 based on classifications 124 and quantization parameters 123. Adaptive threshold module 103 may generate adaptive thresholds 125 using any suitable technique or techniques.

For example, adaptive threshold module 103 may generate adaptive thresholds 125 based on the quantization parameter and the classification of a particular coding unit. For example, the threshold associated with a particular coding unit may be determined by accessing a look up table based on the quantization parameter and the classification or the threshold may be calculated based on the quantization parameter and the classification. Adaptive thresholds 125 may be any suitable values. For example, the adaptive threshold may be determined by adding the quantization parameter and an offset associated with the classification class (e.g., Class 1, 2, or 3) of the intra coding unit. In an embodiment, the adaptive threshold may be determined using Equation (1):

$$\text{Threshold}(QP, \text{Class}) = QP + \text{Offset}(\text{Class}) \quad (1)$$

where Threshold may be the adaptive threshold for a coding unit, QP may be the quantization parameter corresponding to the coding unit, Class may be the class corresponding to the coding unit, and Offset may be an offset that is a function of the class corresponding to the coding unit.

Furthermore, the adaptive thresholds per Class may be related as shown in Relationship (2):

$$\text{Threshold(QP,Class1)} < \text{Threshold(QP,Class3)} < \text{Threshold(QP,Class2)} \quad (2)$$

such that at a given QP, the threshold for Class 1 (e.g., a sharp edge content class) is less than the threshold for Class 3 (e.g., a remainder class), which in turn is less than the threshold for Class 2 (e.g., a texture content class). Such a relationship may be provided by the Class 1 offset being less than the Class 3 offset, which is less than the Class 2 offset.

The offset for each class may be any suitable value. In an embodiment, the offset for each class is in the range of zero to 2×QP. For example, the offset for each class may be provided as a factor to be multiplied by QP in the range of zero to two. In an embodiment, the factor for Class 1 may be in the range of zero to one, the factor for Class 3 may be in the range of 0.5 to 1.5, and the factor for Class 2 may be in the range of one to two. For example, if a coding unit has a QP of 40 and a class has an offset of 20, the threshold for the class may be 60 as provided by Equation (1). The offset of 20 (or any other offset) may be provided as a preselected value or offset or as a factor of the QP. Continuing the example, the offset may be implemented as a factor to be multiplied by QP such as a factor of 0.5 such that the offset is F×QP (where F is the factor) and the threshold is, per Equation (1) 40+0.5×40=60.

Such a structure or relationship may provide for Class 1 (e.g., a sharp edge content class) coding units to have the most transform unit splits (e.g., a greater likelihood of transform unit splits), Class 3 (e.g., a remainder class) to have fewer transform unit splits (e.g., a medium likelihood of transform unit splits), and Class 2 (e.g., a texture content class) to have the fewest transform unit splits (e.g., a smallest likelihood of transform unit splits).

As shown in FIG. 1, split check module 104 may receive adaptive thresholds 125, as well as excessive motion signal (EM) 126, which is discussed further herein with respect to inter coding units. As described, split check module 104 may provide split check skip module 105 (e.g., labeled Residue Based Split Check?), which may determine whether to perform prediction residual based skip checking for transform unit splits. In the illustrated embodiment, in the context of intra coding units, such checking for transform unit splits may always be implemented and split check skip module 105 may be bypassed. As shown, split check module 104 may also provide prediction residue comparison module 106 (e.g., labeled Any Residue>TH?), which may receive adaptive threshold 125 and prediction residues for intra pictures or intra coding units 122 (not shown). Such prediction residues may be received from a differencer for example, which may provide a difference between predicted intra coding units and actual coding units.

Prediction residue comparison module 106 may determine whether or not to split transform units for individual coding units of intra pictures or intra coding units 122 based on adaptive threshold 125. Prediction residue comparison module 106 may determine whether or not to split transform units using any suitable technique or techniques. For example, for an intra coding unit, prediction residue comparison module 106 may compare individual prediction residues of the intra coding unit to the adaptive threshold corresponding to the intra coding unit. As discussed, the adaptive threshold may be based on the quantization parameter (QP) and classification (Class) of the intra coding unit as received via adaptive thresholds 125. If any of the prediction residues of the intra coding unit are greater than (or greater than or equal to) the adaptive threshold, as shown, a transform unit split may be performed (via transform unit split module 110 of transform unit size module 107) such that the transform unit size associated with the intra coding unit is split. The split may be performed using any suitable technique or techniques. In an embodiment, the split is a quad-tree split such that the transform unit is split into four transform units.

If none of the prediction residues of the intra coding unit are greater than (or equal) the adaptive threshold, no split may be performed and the transform unit may follow the coding unit size as shown via transform unit follows coding unit size module 109 of transform unit size module 107. For example, the transform unit following the coding unit size may provide for the transform unit to have the same size as the intra coding unit.

Furthermore, after the first split is performed, split check module 104 may determine whether any of the newly formed transform units should be split again. For example, each prediction residue within the newly formed transform units may be compared to another threshold (e.g., either the same adaptive threshold or an increased threshold) and if any prediction residue exceeds the threshold, the previously split transform unit may again be split. Such techniques are discussed further herein and, in particular, with respect to FIG. 5.

As discussed, responsive to signals from split check module 104, transform unit size module 107 may determine transform unit sizes for coding units. For example, transform unit size module 107 may split transform unit sizes via transform unit split module 110 or not (via modules 108, 109). Such transform unit sizes (TUS) 127 may be transmitted to coding module 111, which may perform forward transforms based on transform unit sizes 127 to generate transform coefficients based on the prediction residues, quantize the transform coefficients, and entropy encode the quantized transform coefficients and a syntax to indicate the transform unit sizes into bitstream 128.

Discussion now turns to coding inter pictures or coding units. As shown, inter analysis module 101 may receive inter pictures or inter coding units 121. Inter pictures or inter coding units 121 may include any suitable data representative of inter pictures or inter coding units such as pixel data, prediction residual data, picture or coding unit size and/or partition data, prediction unit size and/or partition data, or the like. As shown, inter analysis module 101 may determine, for each coding unit or groups of coding units received via inter pictures or inter coding units 121 whether a coding unit has excessive motion, which may be signaled to split check module 104 via an excessive motion signal 126. Excessive motion signal 126 may provide any suitable signal, indicators, or the like indicative of an inter coding unit having excessive motion. For example, excessive motion signal 126 may have a bit value of one for coding units having excessive motion and a bit value of zero for coding units not having excessive. Such excessive motion may characterize, for example, random motion for a coding unit, motion blur for a coding unit or the like.

Inter analysis module 101 may determine excessive motion for the inter coding units using any suitable technique or techniques. In an embodiment, excessive motion may be determined by summing an absolute value of a horizontal component of a motion vector for a coding unit and an absolute value of a vertical component of a motion vector for the coding unit and comparing the sum to a threshold. If the sum is greater than (or greater than or equal to) the threshold, excessive motion is detected. For example, such techniques may detect a large motion vector for an inter coding unit. For example, excessive motion may be detected as shown in Equation (3):

$$|MV\_horizontal|+|MV\_vertical|>Threshold\_EM \quad (3)$$

where MV_horizontal may be the horizontal component of a motion vector for a coding unit,
MV_vertical may be the vertical component of the motion vector for the coding unit, and Threshold_EM may be an excessive motion threshold. The excessive motion threshold may be any suitable value such as a predetermined value, an empirically determined value, or the like.

In addition or in the alternative, inter analysis module 101 may determine excessive motion based on a prediction distortion cost associated with the coding unit. For example, the prediction distortion may be a measure of prediction residues of the coding unit. A smaller prediction distortion may be indicative of higher temporal correlation (e.g., low motion). In an embodiment, inter analysis module 101 may determine excessive motion based on the sum of the absolute value of the horizontal component of the motion vector and the absolute value of the vertical component of the motion vector being greater than (or greater than or equal to) a threshold and the prediction distortion being non-negligible (e.g., greater than a threshold).

In another embodiment, inter analysis module 101 may determine excessive motion at a picture level. For example, such large motion vector and temporal correlation techniques may be applied at a picture level (e.g., if a percentage of coding units have large motion, the picture is determined to have excessive motion) and/or other inter prediction statistics or the like may be used to determine a picture has excessive motion such as random motion or motion blur or the like. In such examples, an entire picture may be determined to have excessive motion and each inter coding unit of the picture may also be determined to have excessive motion, which may be indicated via excessive motion signal 126.

As shown, split check skip module 105 of split check module 104 may receive excessive motion signal 126 and split check skip module 105 may determine whether to skip checking for a transform unit split for an inter coding unit based, in part, on excessive motion signal 126. For example, split check skip module 105 may also receive a size of the coding units of inter pictures or inter coding units 121. Split check skip module 105 may determine whether to skip checking for a transform unit split for an inter coding unit using any suitable technique or techniques. In an embodiment, split check skip module 105 may evaluate the size of the inter coding unit and, if the coding unit is 8×8 pixels, transform unit split checking may be skipped. In addition or in the alternative, split check skip module 105 may evaluate excessive motion signal 126 such that if an inter coding unit has excessive motion, transform unit split checking may be skipped.

For example, if a coding unit is 8×8 pixels, prediction residue based split check (as implemented by prediction residue comparison module 106) is skipped and the transform unit size follows the prediction unit size as shown via transform unit follows prediction unit size module 108 of transform unit size module 107. If the coding unit is larger than 8×8 pixels and the coding unit has excessive motion (e.g., it is a motion blur unit or block or a unit or block with random motion) as provided by excessive motion signal 126, prediction residue based split check (as implemented by prediction residue comparison module 106) is skipped and the transform unit size follows the prediction unit size as shown via transform unit follows prediction unit size module 108 of transform unit size module 107.

In some examples, transform units are limited to square transform units and the transform unit size following the prediction unit size may include the transform unit size being the same as the prediction unit size (if the prediction unit is square) or the transform unit size being the same as a smaller edge of the prediction unit (if the prediction unit is rectangular). For example, if an 8×8 inter coding unit has two 8×4 prediction units, the transform unit size following the prediction unit size would provide for a transform unit size of 4×4. In such contexts, a single 8×8 inter coding unit may have two 8×4 prediction units each having two 4×4 transform units.

If prediction residue based split check is not skipped (e.g., the inter coding unit is larger than 8×8 and no excessive motion is detected), prediction residue comparison module 106 may receive a signal from split check skip module 105 to perform prediction residue based split check for the inter coding unit. Furthermore, as shown, adaptive threshold module 103 may receive, via quantization parameters 123, a quantization parameter associated with the inter coding unit and adaptive threshold module 103 may generate a quantization parameter based adaptive threshold for the inter coding unit, which adaptive threshold module 103 may provide to prediction residue comparison module 106 via adaptive thresholds 125. The adaptive threshold may generated using any suitable technique or techniques. In an embodiment, the adaptive threshold is generated by adding an offset to the quantization parameter for the inter coding unit in analogy to the discussion of Equation (1). For example, an inter offset may be added to the quantization parameter to generate the adaptive threshold.

Prediction residue comparison module 106 may receive thresholds 125, as well as excessive motion signal 126 and prediction residuals (not shown) associated with the inter coding units. Prediction residue comparison module 106 may determine whether or not to split transform units for individual coding units of inter pictures or inter coding units 122 based on the received adaptive threshold and prediction residuals. Prediction residue comparison module 106 may determine whether or not to split transform units using any suitable technique or techniques. For example, for an inter coding unit, prediction residue comparison module 106 may compare individual prediction residues of the inter coding unit to the adaptive threshold corresponding to the inter coding unit. If any of the prediction residues of the inter coding unit are greater than (or greater than or equal to) the adaptive threshold, as shown, a transform unit split may be performed (via transform unit split module 110 of transform unit size module 107) such that the transform unit size associated with the inter coding unit is split. The split may be performed using any suitable technique or techniques. In an embodiment, the split is a quad-tree split such that the transform unit is split into four transform units.

If none of the prediction residues of the inter coding unit are greater than (or equal) the adaptive threshold, no split may be performed and the transform unit may follow the coding unit size as shown via transform unit follows coding unit size module 109 of transform unit size module 107. For example, the transform unit following the coding unit size may provide for the transform unit to have the same size as the intra coding unit.

Furthermore, as discussed with respect to intra coding units, after the first split is performed, split check module 104 may determine whether any of the newly formed transform units should be split again. For example, each prediction residue within the newly formed transform units may be compared to another threshold (e.g., an increased threshold) and if any prediction residue exceeds the threshold, the previously split transform unit may again be split. Such techniques are discussed further herein and, in particular, with respect to FIG. 5.

As discussed, responsive to signals from split check module 104, transform unit size module 107 may determine transform unit sizes for coding units. For example, transform unit size module 107 may split transform unit sizes via transform unit split module 110 or not (via modules 108, 109) and such transform unit sizes 127 may be transmitted to coding module 111, which may perform forward transforms based on transform unit sizes 127 to generate transform coefficients based on the prediction residues, quantize the transform coefficients, and entropy encode the quantized transform coefficients and a syntax to indicate the transform unit sizes into bitstream 128.

Figure 3:
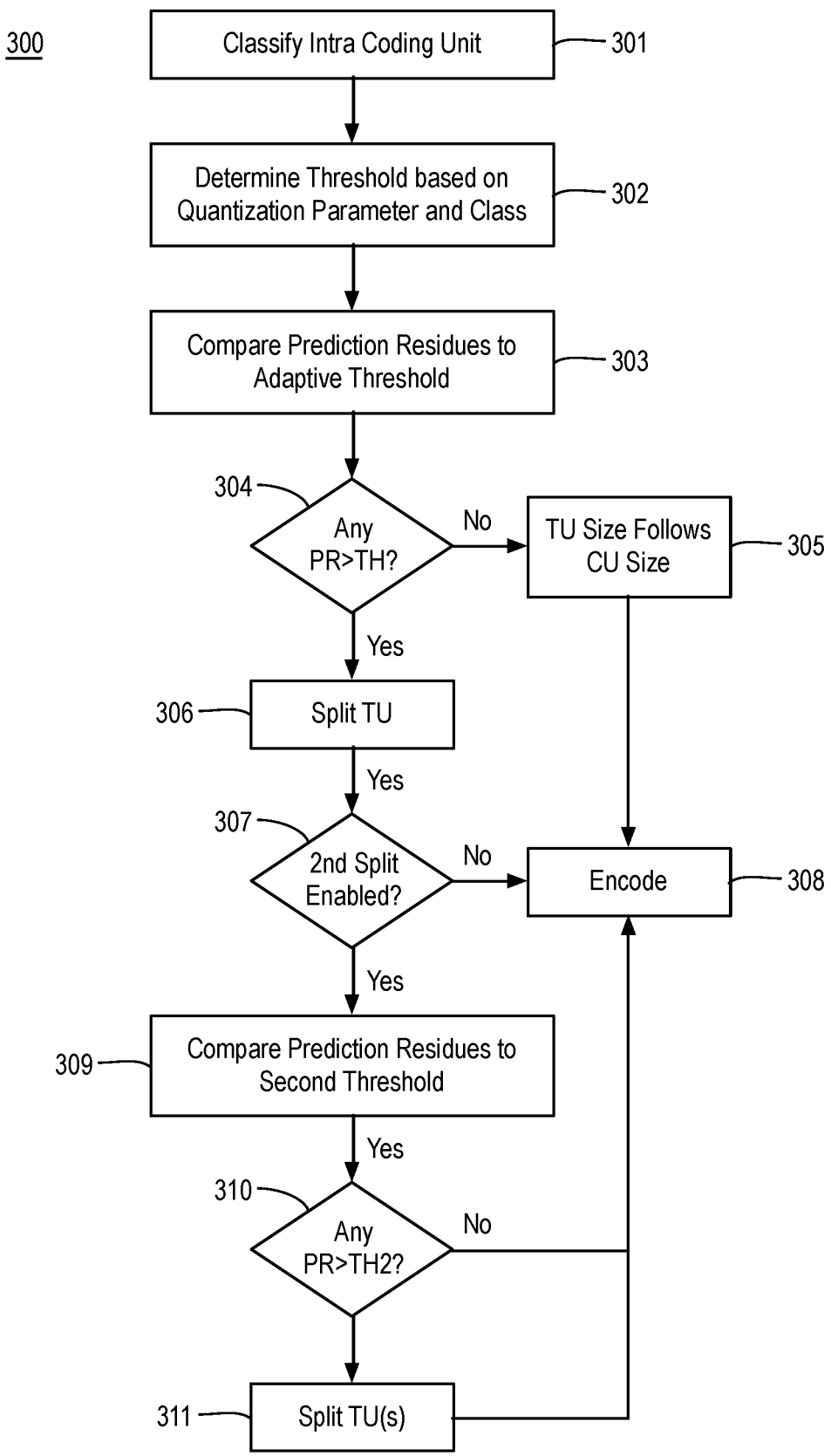
FIG. 3 is a flow diagram illustrating an example process for video coding including determining transform unit sizes for intra units.

FIG. 3 is a flow diagram illustrating an example process 300 for video coding including determining transform unit sizes for intra units, arranged in accordance with at least some implementations of the present disclosure. Process 300 may include one or more operations 301-311 as illustrated in FIG. 3. Process 300 may be performed by a device (e.g., system 100 as discussed herein) to code video including determining transform unit sizes for intra units such as intra coding units. Process 300 may be performed at a coding unit level and process 300 may be repeated for any number of intra coding units.

Process 300 may begin at operation 301, where an intra coding unit may be classified. The intra coding unit may be classified using any suitable technique or techniques. Furthermore, any number and types of classes may be used in the classification of the coding unit. In an embodiment, three classes including a sharp edge content class, a texture content class, and a remainder class may be used. In an embodiment, the intra coding unit may be classified based on intra coding unit variance and/or sub-intra coding unit variances as discussed with respect to process 200 and elsewhere herein.

Processing may continue at operation 302, where an adaptive transform unit split threshold may be determined for the intra coding unit based on the classification performed at operation 301 and a quantization parameter associated with the intra coding unit. The adaptive transform unit split threshold may be determined using any suitable technique or techniques. In an embodiment, the adaptive transform unit split threshold may be determined by adding the quantization parameter associated with the intra coding unit to an offset associated with the class in which the coding unit was classified as discussed with respect to Equation (1). In an embodiment, the offset may be predetermined value and, in another embodiment, the offset may be determined based on multiplying a predetermined factor by the quantization parameter associated with the intra coding unit.

Processing may continue at operation 303, where the adaptive transform unit split threshold determined at operation 302 may be compared to prediction residues of the intra coding unit. The prediction residues may be compared to the adaptive transform unit split threshold using any suitable technique or techniques. In an embodiment, the prediction residues are each compared with the adaptive transform unit split threshold until a prediction residue exceeding the adaptive transform unit split threshold is found, at which point, the comparison stops (as a hit has been found), or the search continues until no prediction residue exceeding the adaptive transform unit split threshold is found.

Processing may continue at decision operation 304, where a determination may be made as to whether any of the prediction residues (PR) of the intra coding unit are greater than (or greater than or equal to) the adaptive transform unit split threshold (TH). If not, processing may continue at operation 305, where the transform unit size of the intra coding unit may follow the coding unit size. For example, the transform unit may not be split.

If any of the prediction residues of the intra coding unit are greater than (or greater than or equal to) the adaptive transform unit split threshold, processing may continue at operation 306, where the transform unit may be split. The transform unit may be split using any suitable technique or techniques. In an embodiment, the transform unit split may be a quad-tree split such that the transform unit is split into four transform units or sub-transform units or the like.

Processing may continue at decision operation 307, where a determination may be made as to whether a second split of the transform unit is enabled. If so, processing may continue at operation 309, where prediction residues of the previously split transform units may be compared to a second threshold. The second threshold may be any suitable threshold. In an embodiment, the second threshold may be the same threshold implemented at operations 303, 304. In an embodiment, the second threshold may be increased by an offset with respect to the threshold implemented at operations 303, 304. In an embodiment, the second threshold may be predetermined threshold. The comparison of the prediction residues to the second threshold may be performed using any suitable technique or techniques.

Processing may continue at operation 310, where a determination may be made as to whether any of the prediction residues (PR) of the intra coding unit are greater than (or greater than or equal to) the second threshold (TH2). If not, processing may continue at operation 305, where the transform sizes of the previously split transform unit may be used.

If any of the prediction residues of the intra coding unit are greater than (or greater than or equal to) the second threshold, processing may continue at operation 311, where the previously split transform unit(s) within which the prediction residue(s) exceeding the second threshold reside may again be split. Such a split or splits may be performed using any suitable technique or techniques. In an embodiment, the split or splits may be quad-tree splits such that the previously split transform unit(s) are each split into four transform units or sub-transform units or the like.

Processing may continue from any of decision operation 304, decision operation 310, or operation 311 at operation 308, where the intra coding unit may be encoded based on the determined transform unit size or units sizes. For example, the prediction residuals of the coding unit may be transformed using the transform unit or units to generate transform coefficients, which may be quantized, scanned, and entropy encoded into a bitstream. A syntax associated with the transform unit size or units sizes may also be entropy encoded into the bitstream.

Figure 4:
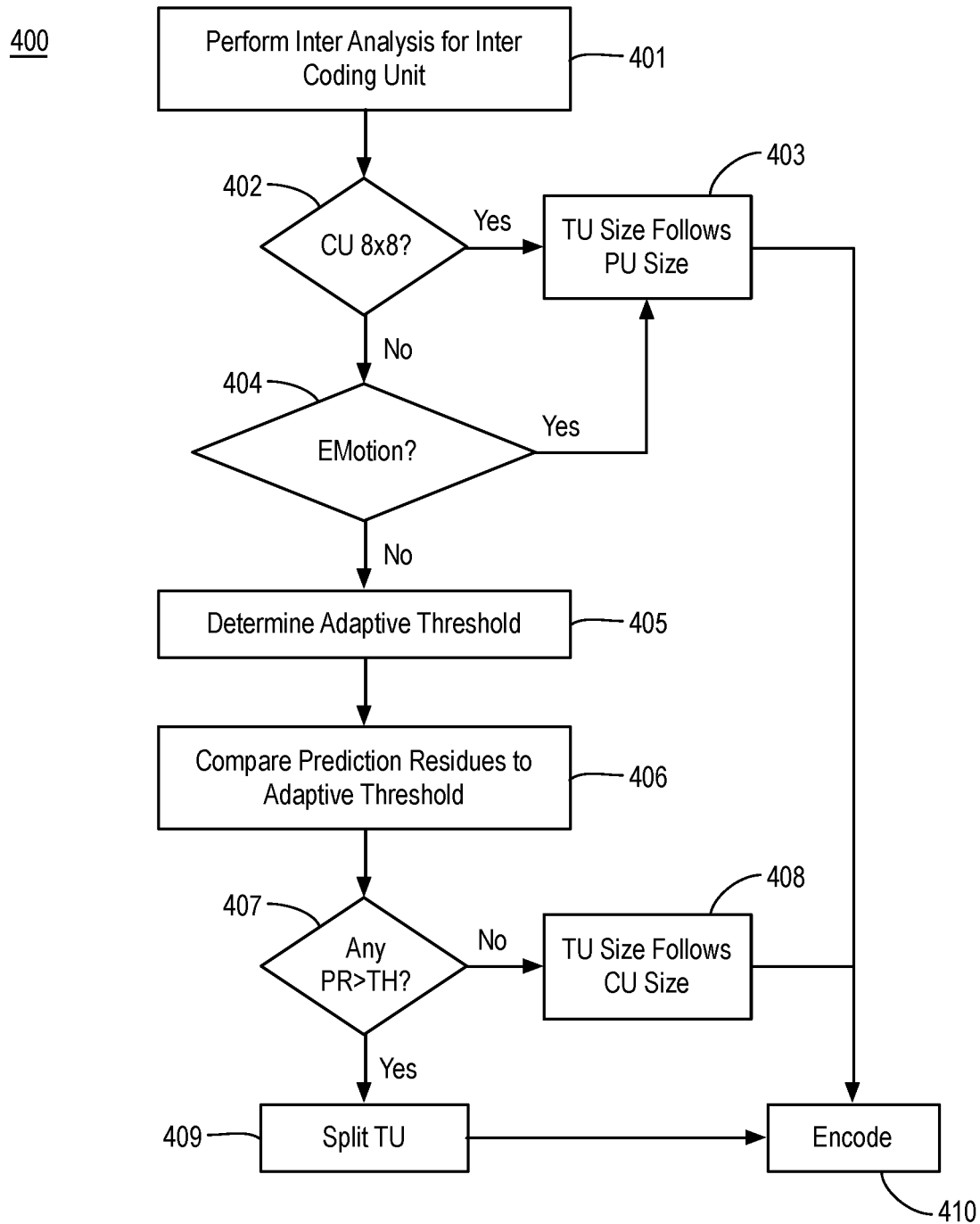
FIG. 4 is a flow diagram illustrating an example process for video coding including determining transform unit sizes for inter units.

FIG. 4 is a flow diagram illustrating an example process 400 for video coding including determining transform unit sizes for inter units, arranged in accordance with at least some implementations of the present disclosure. Process 400 may include one or more operations 401-410 as illustrated in FIG. 4. Process 400 may be performed by a device (e.g., system 100 as discussed herein) to code video including determining transform unit sizes for inter units such as inter coding units. Process 400 may be performed at a coding unit level and process 400 may be repeated for any number of intra coding units.

Process 400 may begin at operation 401, where inter analysis may be performed for an inter coding unit. The inter analysis may be performed using any suitable technique or techniques. For example, the inter analysis may include determining whether the inter coding unit has excessive motion. In an embodiment, the inter coding unit may have excessive motion when a sum of an absolute value of a horizontal component of a motion vector corresponding to the inter coding unit and an absolute value of a vertical component of the motion vector is greater than (or greater than or equal to) a threshold and a prediction distortion corresponding to the inter coding unit is non-negligible (e.g., greater than a threshold). For example, such excessive motion may be indicative of random motion or motion blur for the inter coding unit and/or the picture in which the inter coding unit resides.

Processing may continue at decision operation 402, where a determination may be made as to whether the inter coding unit (CU) has a size of 8 (e.g., is 8×8 pixels) or smaller (if allowed by the codec). If so, processing may continue at operation 403, where the transform unit size of the inter coding unit may follow the prediction unit size or units sizes corresponding to the inter coding unit. For example, if a prediction unit is square, the transform unit size may equal the prediction unit size and, if a prediction unit is rectangular, the transform unit may be a square having a size equal to the shorter edge of the prediction unit.

Processing may continue at decision operation 404, where a determination may be made as to whether the inter coding unit has excessive motion as evaluated at operation 401. For example, such excessive motion may be indicative of random motion or motion blur for the inter coding unit and/or the picture in which the inter coding unit resides. As shown, in an embodiment, inter analysis may be performed for the inter coding unit (or units) at the outset of process 400. In other embodiments, such inter analysis may be performed after decision operation 402. If excessive motion is detected or determined at operation 404, processing may continue at operation 403, where the transform unit size of the inter coding unit may follow the prediction unit size or units sizes corresponding to the inter coding unit, as discussed.

If excessive motion is not detected at decision operation 404 and the inter coding unit is determined to be larger than 8×8 pixels as determined at decision operation 402, processing may continue at operation 405, where adaptive transform unit split threshold corresponding to the inter transform unit may be determined. The adaptive transform unit split threshold may be determined using any suitable technique or techniques. In an embodiment, the adaptive transform unit split threshold may be based on a quantization parameter corresponding to the inter transform unit. For example, the adaptive transform unit split threshold may be a sum of the quantization parameter corresponding to the inter transform unit and an offset factor.

Processing may continue at operation 406, where the adaptive transform unit split threshold determined at operation 405 may be compared to prediction residues of the inter coding unit. The prediction residues may be compared to the adaptive transform unit split threshold using any suitable technique or techniques. In an embodiment, the prediction residues are each compared with the adaptive transform unit split threshold until a prediction residue exceeding the adaptive transform unit split threshold is found, at which point, the comparison stops (as a hit has been found), or the search continues until no prediction residue exceeding the adaptive transform unit split threshold is found.

Processing may continue at decision operation 407, where a determination may be made as to whether any of the prediction residues (PR) of the inter coding unit are greater than (or greater than or equal to) the adaptive transform unit split threshold (TH). If not, processing may continue at operation 408, where the transform unit size of the inter coding unit may follow the coding unit size. For example, the transform unit may not be split.

If any of the prediction residues of the inter coding unit are greater than (or greater than or equal to) the adaptive transform unit split threshold, processing may continue at operation 409, where the transform unit may be split. The transform unit may be split using any suitable technique or techniques. In an embodiment, the transform unit split may be a quad-tree split such that the transform unit is split into four transform units or sub-transform units or the like.

Although not shown in process 400, a second split option for the transform units may be provided for inter coding units in analogy to the second split option provided via operations 307, 309, 310, and 311 of process 300. Such processing in the context of process 400 may include determining whether the second split of the transform unit is enabled. If so, prediction residues of the previously split transform units may be compared to a second threshold, which may be the same as the adaptive threshold determined at operation 405, the adaptive threshold determined at operation 405 increased by an offset, or a predetermined threshold. If any of the prediction residues of the inter coding unit are greater than (or greater than or equal to) the second threshold, the previously split transform unit(s) within which the prediction residue(s) exceeding the second threshold reside may again be split. If none of the prediction residues exceed the second threshold, a second split may not be performed and the transform sizes of the previously split transform unit (e.g., as determined at operation 409) may be used.

Processing may continue from any of operation 403, operation 408, or operation 409 (or from a second split operation if employed) at operation 410, where the inter coding unit may be encoded based on the determined transform unit size or units sizes. For example, the prediction residuals of the coding unit may be transformed using the transform unit or units to generate transform coefficients, which may be quantized, scanned, and entropy encoded into a bitstream. A syntax associated with the transform unit size or units sizes may also be entropy encoded into the bitstream.

As discussed, in various examples, a transform unit may be split once or twice to generate split transform units including sub-units or newly generated transform units or the like.

Figure 5:
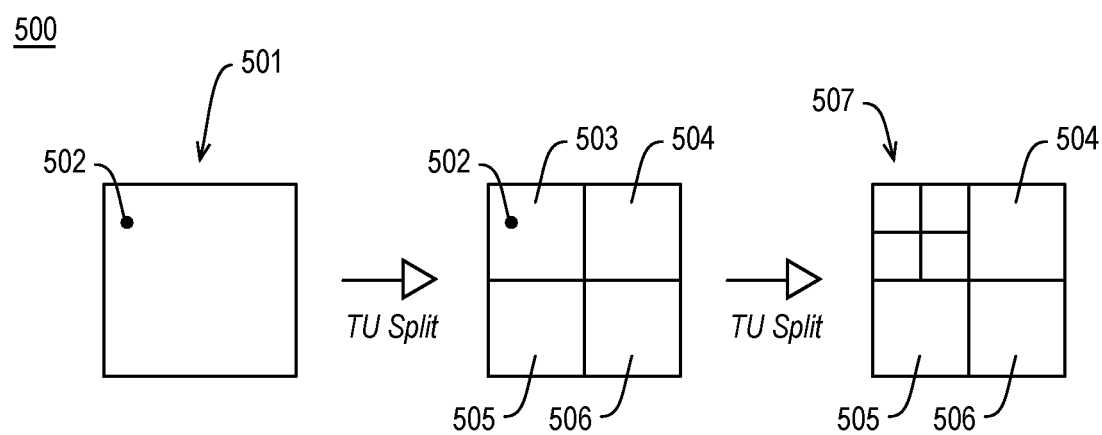
FIG. 5 illustrates an example transform unit splitting.

FIG. 5 illustrates an example transform unit splitting 500, arranged in accordance with at least some implementations of the present disclosure. As shown in FIG. 5, a transform unit 501, which may be the same size as a coding unit and/or a prediction unit or smaller than coding unit and/or a prediction unit, may include one or more prediction residuals such as prediction residual 502 that is greater than an adaptive transform unit split threshold corresponding to transform unit 501 (and/or the coding unit in which transform unit 501 resides). Based on prediction residual 502 being greater than the adaptive transform unit split threshold, as shown, transform unit 501 may be split into multiple transform units 503, 504, 505, 506. For example, transform unit 501 may be split into four equal sized transform units 503, 504, 505, 506 in response to prediction residual 502 being greater than the adaptive transform unit split threshold.

In examples where second splitting is not enabled or allowed, the coding unit corresponding to transform unit 501 may be coded based on transform units 503, 504, 505, 506. For example, if the coding unit and transform unit 501 are 16×16 pixels, the coding unit may be encoded based on transforming the prediction residuals with transform unit 503 with an 8×8 transform, the prediction residuals with transform unit 504 with an 8×8 transform, the prediction residuals with transform unit 505 with an 8×8 transform, and the prediction residuals with transform unit 505 with an 8×8 transform.

In examples where second splitting is enabled, the prediction residuals may be compared to a second threshold, as discussed. If none of the prediction residuals are greater than the second threshold, the coding unit corresponding to transform unit 501 may be coded based on transform units 503, 504, 505, 506 as described. If any of the prediction residuals are greater than the second threshold, transform unit 501 may be split again. For example, if prediction residual 502 is greater than the second threshold, as shown, transform unit 503 may be split into multiple transform units 507 based on prediction residual 502 being with transform unit 503. For example, transform unit 503 may be split into four equal sized transform units 507, having no prediction residual greater than the second threshold in this example, may not be further split. If any of transform units 504, 505, 506 had therein a prediction residual greater than the second threshold, they would also be split into four equal sized transform units similar to transform units 507.

Figure 6:
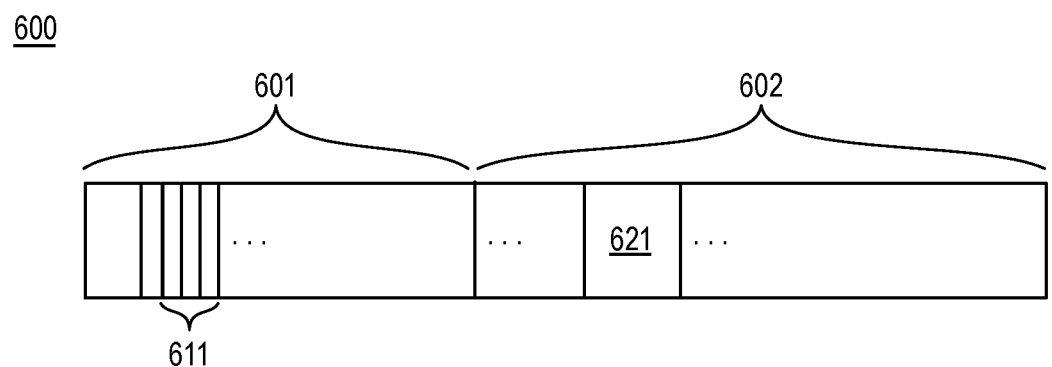
FIG. 6 illustrates an example bitstream.

FIG. 6 illustrates an example bitstream 600, arranged in accordance with at least some implementations of the present disclosure. In some examples, bitstream 600 may correspond to bitstream 128 as shown in FIG. 1. As shown in FIG. 6, in some examples, bitstream 600 may include a header portion 601 and a data portion 602. In some examples, transform unit split indicators including indicators or flags or bits or the like indicating transform unit splits and/or transform unit sizes or the like may be provided via bitstream 600 by transform split indicators or flags 611. Furthermore, data portion 602 may include encoded picture data 621 for coded pictures such that encoded picture data 621 includes encoded intra or inter coding units coded based on the transform unit splits and/or sizes as discussed herein. For example, encoded picture data 621 may include a representation of encoded versions of inter pictures or inter coding units 121, inter pictures or inter coding units 122, or the like. Such encoded picture data 621 may include, for example, encoded quantized transform coefficients, encoded motion vector data, encoded picture reconstruction data, or the like.

Figure 7:
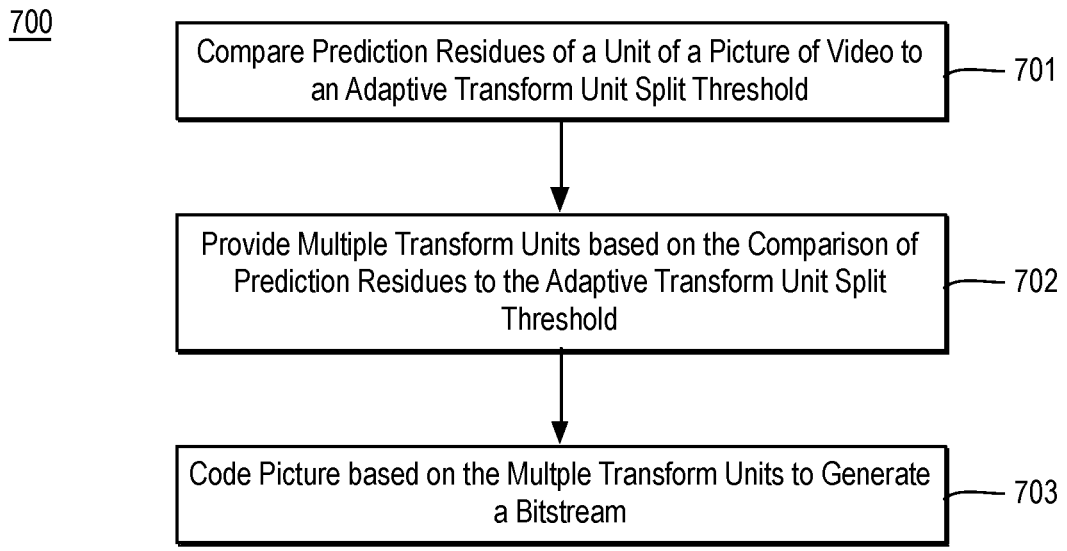
FIG. 7 is a flow diagram illustrating an example process for video coding including transform unit size determination.

FIG. 7 is a flow diagram illustrating an example process 700 for video coding including transform unit size determination, arranged in accordance with at least some implementations of the present disclosure. Process 700 may include one or more operations 701-703 as illustrated in FIG. 7. Process 700 may form at least part of a video coding process. By way of non-limiting example, process 700 may form at least part of a video coding process as performed by any device or system as discussed herein such as system 100. Furthermore, process 700 will be described herein with reference to system 800 of FIG. 8.

Figure 8:
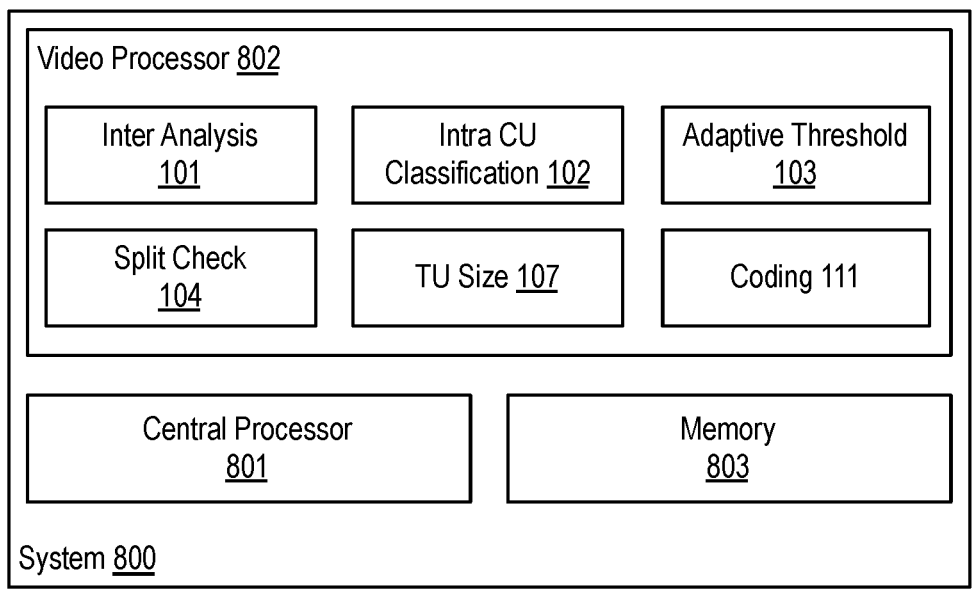
FIG. 8 is an illustrative diagram of an example system 800 for video coding including transform unit size determination.

FIG. 8 is an illustrative diagram of an example system 800 for video coding including transform unit size determination, arranged in accordance with at least some implementations of the present disclosure. As shown in FIG. 8, system 800 may include a central processor 801, a video processor 802, and a memory 803. Also as shown, video processor 802 may include inter analysis module 101, intra coding unit classification module 102, adaptive threshold module 103, split check module 104, transform unit size module 107, and coding module 111. In the example of system 800, memory 803 may store video data or related content such as video, video data, picture data, frame data, picture type data, quantization parameters, temporal correlation data, excessive motion data, transform split indicators, coding unit data, prediction unit data, pixel data, prediction residue data, classification data, adaptive transform unit split threshold data, offset data, bitstream data, and/or any other data as discussed herein.

As shown, in some examples, inter analysis module 101, intra coding unit classification module 102, adaptive threshold module 103, split check module 104, transform unit size module 107, and coding module 111 may be implemented via video processor 802. In other examples, one or more or portions of inter analysis module 101, intra coding unit classification module 102, adaptive threshold module 103, split check module 104, transform unit size module 107, and coding module 111 may be implemented via central processor 801 or another processing unit such as an image processor, a graphics processor, or the like.

Video processor 802 may include any number and type of video, image, or graphics processing units that may provide the operations as discussed herein. Such operations may be implemented via software or hardware or a combination thereof. For example, video processor 802 may include circuitry dedicated to manipulate pictures, picture data, or the like obtained from memory 803. Central processor 801 may include any number and type of processing units or modules that may provide control and other high level functions for system 800 and/or provide any operations as discussed herein. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 703 may be implemented by cache memory.

In an embodiment, one or more or portions of inter analysis module 101, intra coding unit classification module 102, adaptive threshold module 103, split check module 104, transform unit size module 107, and coding module 111 may be implemented via an execution unit (EU). The EU may include, for example, programmable logic or circuitry such as a logic core or cores that may provide a wide array of programmable logic functions. In an embodiment, one or more or portions of inter analysis module 101, intra coding unit classification module 102, adaptive threshold module 103, split check module 104, transform unit size module 107, and coding module 111 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 7, process 700 may begin at operation 701, where individual prediction residues of a unit of a picture of video may compared to an adaptive transform unit split threshold corresponding to the unit. The individual prediction residues of the unit may compared to the adaptive transform unit split threshold corresponding to the unit using any suitable technique or techniques. In an embodiment, split check module 104 as implemented via video processor 802 may compare the individual prediction residues of the unit to the adaptive transform unit split threshold. In an embodiment, each of the individual prediction residues of the unit may compared to the adaptive transform unit split threshold.

Processing may continue at operation 702, where multiple transform units may be provided for the coding the unit based on the comparison of each prediction residue to the adaptive threshold. The multiple transform units may be provided using any suitable technique or techniques. In an embodiment, transform unit size module 107 as implemented via video processor 802 may provide the multiple transform units. In an embodiment, providing the multiple transform units may include performing a transform unit split of a transform unit corresponding to the unit responsive to any one of the prediction residues of the unit exceeding the adaptive transform unit split threshold.

Furthermore, in some embodiments, individual second prediction residues of a second unit of the video may be compared to a second adaptive transform unit split threshold corresponding to the second unit and a single transform unit may be provided for the second unit responsive to all of the second prediction residues not exceeding the adaptive transform unit split threshold. For example, the single transform unit may corresponds to at least one of a coding unit size or a prediction unit size corresponding to the second unit. For example, no transform unit split may be performed. In an embodiment, individual second prediction residues of a second unit of the video may be compared to a second adaptive transform unit split threshold corresponding to the second unit and one or more transform units may be provided for the second unit responsive to all of the second prediction residues not exceeding the adaptive transform unit split threshold. For example, no split may be provided but multiple transform units may be needed such as when a rectangular prediction unit is used or the like.

In examples where the unit comprises an intra unit such as an intra coding unit, process 700 may further include classifying the intra unit into a first class of multiple classes and generating a quantization parameter based adaptive threshold for each of the multiple classes, wherein the adaptive transform unit split threshold comprises the quantization parameter based adaptive threshold for the first class. In an embodiment, the multiple classes may include a sharp edge content class or a texture block class. In an embodiment, the multiple classes include a sharp edge content class, a texture content class, and a remainder class.

In an embodiment, classifying the intra unit may include classifying the intra unit into the sharp edge content class when the intra unit is screen content, classifying the intra unit into the remainder class when a variance of the intra unit is less than a first threshold, classifying the intra unit into the sharp edge content class when a minimum sub-unit variance is less than a second threshold and less than a first predetermined percentage of the variance of the intra unit, classifying the intra unit into the texture content class when the minimum sub-unit variance is greater than a second predetermined percentage of a maximum sub-unit variance or when the minimum sub-unit variance is greater than a third threshold, and classifying the intra unit into the sharp edge content class when the variance of the intra unit is greater than a fourth threshold.

In examples where the unit comprises an inter unit such as an inter coding unit, process 700 may further include performing inter analysis on the inter unit to detect excessive motion corresponding to the inter unit. For example, in such contexts, comparing each prediction residue may be performed responsive to no excessive motion being detected. In an embodiment, comparing each prediction residue is further performed responsive to the inter unit being larger than 8×8 pixels. In an embodiment, process 700 may further include performing an inter analysis of a second inter unit of the video to detect motion blur or random motion corresponding to the second unit and providing a single transform unit for the second unit responsive to the second unit having at least one of motion blur or random motion. For example, no transform unit split may be performed and the single transform unit may correspond to a prediction unit size corresponding to the second unit.

In examples where a second transform unit splitting is enabled or allowed, process 700 may further include comparing, for at least a first transform unit of the multiple transform units, individual prediction residues of the first transform unit to a second threshold and splitting the first transform unit based on a first prediction residue of the first transform unit exceeding the second threshold. Furthermore, any previously split transform unit having a prediction residue therein that exceeds the second threshold may be split.

Processing may continue at operation 703, where the picture of the video may be coded based at least in part on the multiple transform units to generate a bitstream including the coded picture. Such coding may include, for example, transforming the prediction residues of the unit based on the multiple transform units to generate transform coefficients, quantizing the transform coefficients, scanning the quantized transform coefficients, and entropy encoding the scanned quantized transform coefficients. Furthermore, a transform split syntax associated with the multiple transform units may be entropy encoded and inserted into the bitstream.

Process 700 may be repeated any number of times either in series or in parallel for any number pictures or coding units or the like. As discussed, process 700 may provide for video encoding including transform unit size determination.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
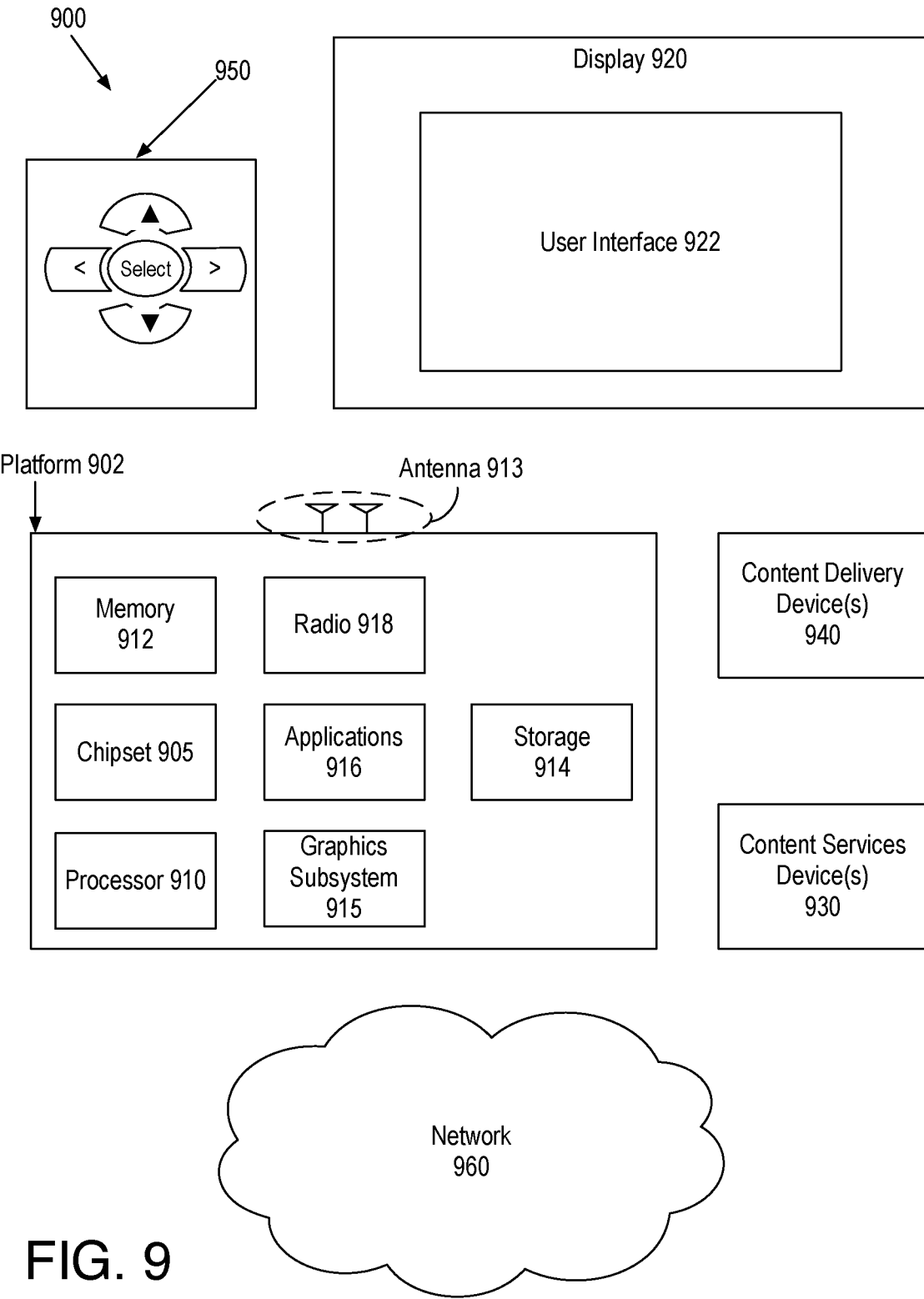
FIG. 9 is an illustrative diagram of an example system.

FIG. 9 is an illustrative diagram of an example system 900, arranged in accordance with at least some implementations of the present disclosure. In various implementations, system 900 may be a mobile system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of may be used to interact with user interface 922, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 920) by movements of a pointer, cursor, focus ring, or other visual indicators displayed on the display. For example, under the control of software applications 916, the navigation features located on navigation may be mapped to virtual navigation features displayed on user interface 922, for example. In various embodiments, may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off" In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
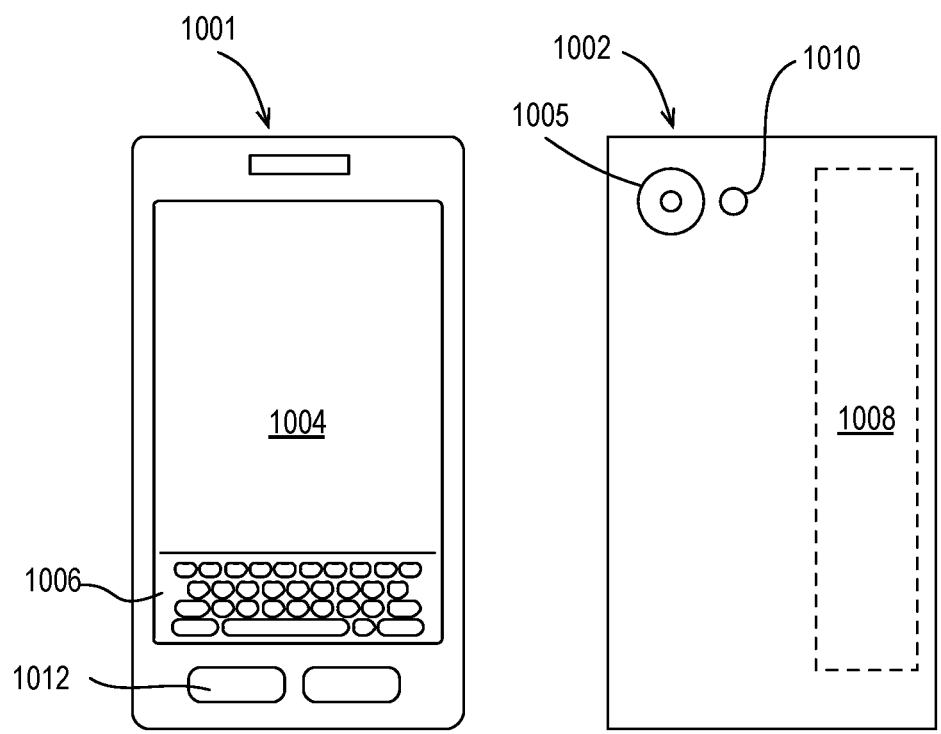
FIG. 10 illustrates an example device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, system 100 or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eye-glass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include a camera 1005 (e.g., including a lens, an aperture, and an imaging sensor) and a flash 1010 integrated into back 1002 (or elsewhere) of device 1000. In other examples, camera 1005 and flash 1010 may be integrated into front 1001 of device 1000 or both front and back cameras may be provided. Camera 1005 and flash 1010 may be components of a camera module to originate image data processed into streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video coding comprises comparing individual prediction residues of a unit of a picture of video to an adaptive transform unit split threshold corresponding to the unit, providing multiple transform units for coding the unit based on the comparison of each prediction residue to the adaptive threshold, and coding the picture of the video based at least in part on the multiple transform units to generate a bitstream including the coded picture.

Further to the first embodiments, providing the multiple transform units comprises performing a transform unit split of a transform unit corresponding to the unit responsive to any one of the prediction residues of the unit exceeding the adaptive transform unit split threshold.

Further to the first embodiments, the method further comprises comparing individual second prediction residues of a second unit of the video to a second adaptive transform unit split threshold corresponding to the second unit and providing a single transform unit for the second unit responsive to all of the second prediction residues not exceeding the adaptive transform unit split threshold, wherein the single transform unit corresponds to at least one of a coding unit size or a prediction unit size corresponding to the second unit.

Further to the first embodiments, the unit comprises an intra unit and the method further comprises classifying the intra unit into a first class of multiple classes and generating a quantization parameter based adaptive threshold for each of the multiple classes, wherein the adaptive transform unit split threshold comprises the quantization parameter based adaptive threshold for the first class.

Further to the first embodiments, the unit comprises an intra unit and the method further comprises classifying the intra unit into a first class of multiple classes and generating a quantization parameter based adaptive threshold for each of the multiple classes, wherein the adaptive transform unit split threshold comprises the quantization parameter based adaptive threshold for the first class, wherein the multiple classes comprise at least one of a sharp edge content class or a texture block class.

Further to the first embodiments, the unit comprises an intra unit and the method further comprises classifying the intra unit into a first class of multiple classes and generating a quantization parameter based adaptive threshold for each of the multiple classes, wherein the adaptive transform unit split threshold comprises the quantization parameter based adaptive threshold for the first class, wherein the multiple classes consist of a sharp edge content class, a texture content class, and a remainder class.

Further to the first embodiments, the unit comprises an intra unit and the method further comprises classifying the intra unit into a first class of multiple classes and generating a quantization parameter based adaptive threshold for each of the multiple classes, wherein the adaptive transform unit split threshold comprises the quantization parameter based adaptive threshold for the first class, wherein the multiple classes consist of a sharp edge content class, a texture content class, and a remainder class and classifying the intra unit comprises classifying the intra unit into the sharp edge content class when the intra unit is screen content, classifying the intra unit into the remainder class when a variance of the intra unit is less than a first threshold, classifying the intra unit into the sharp edge content class when a minimum sub-unit variance is less than a second threshold and less than a first predetermined percentage of the variance of the intra unit, classifying the intra unit into the texture content class when the minimum sub-unit variance is greater than a second predetermined percentage of a maximum sub-unit variance or when the minimum sub-unit variance is greater than a third threshold, and classifying the intra unit into the sharp edge content class when the variance of the intra unit is greater than a fourth threshold.

Further to the first embodiments, the unit comprises an intra unit and the method further comprises classifying the intra unit into a first class of multiple classes and generating a quantization parameter based adaptive threshold for each of the multiple classes, wherein the adaptive transform unit split threshold comprises the quantization parameter based adaptive threshold for the first class and/or wherein the multiple classes comprise at least one of a sharp edge content class or a texture block class.

Further to the first embodiments, the unit comprises an inter unit and the method further comprises performing inter analysis on the inter unit to detect excessive motion corresponding to the inter unit, wherein said comparing each prediction residue is performed responsive to no excessive motion being detected.

Further to the first embodiments, the unit comprises an inter unit and the method further comprises performing inter analysis on the inter unit to detect excessive motion corresponding to the inter unit, wherein said comparing each prediction residue is performed responsive to no excessive motion being detected, wherein said comparing each prediction residue is further performed responsive to the inter unit being larger than 8×8 pixels.

Further to the first embodiments, the unit comprises an inter unit and the method further comprises performing inter analysis on the inter unit to detect excessive motion corresponding to the inter unit, wherein said comparing each prediction residue is performed responsive to no excessive motion being detected and/or wherein said comparing each prediction residue is further performed responsive to the inter unit being larger than 8×8 pixels.

Further to the first embodiments, the method further comprises performing an inter analysis of a second unit of the video to detect motion blur or random motion corresponding to the second unit, wherein the second unit comprises an inter unit and providing a single transform unit for the second unit responsive to the second unit having at least one of motion blur or random motion, wherein the single transform unit corresponds to a prediction unit size corresponding to the second unit.

Further to the first embodiments, the method further comprises comparing, for at least a first transform unit of the multiple transform units, individual prediction residues of the first transform unit to a second threshold and splitting the first transform unit based on a first prediction residue of the first transform unit exceeding the second threshold.

Further to the first embodiments, the bitstream comprises at least one of a high efficiency video coding (HEVC) compliant bitstream or a VP9 compliant bitstream.

In one or more second embodiments, a system for video coding comprises a memory to store a picture of video and a processor coupled to the memory, the processor to compare individual prediction residues of a unit of the picture of video to an adaptive transform unit split threshold corresponding to the unit, to provide multiple transform units for coding the unit based on the comparison of each prediction residue to the adaptive transform unit split threshold, and to code the picture of the video based at least in part on the multiple transform units to generate a bitstream including the coded picture.

Further to the second embodiments, the processor to provide the multiple transform units comprises the processor to perform a transform unit split of a transform unit corresponding to the unit responsive to any one of the prediction residues of the unit exceeding the adaptive transform unit split threshold.

Further to the second embodiments, the processor is further to compare individual second prediction residues of a second unit of the video to a second adaptive transform unit split threshold corresponding to the second unit and to provide a single transform unit for the second unit responsive to all of the second prediction residues not exceeding the adaptive transform unit split threshold, wherein the single transform unit corresponds to at least one of a coding unit size or a prediction unit size corresponding to the second unit.

Further to the second embodiments, the unit comprises an intra unit and the processor is further to classify the intra unit into a first class of multiple classes and to generate a quantization parameter based adaptive threshold for each of the multiple classes, wherein the adaptive transform unit split threshold comprises the quantization parameter based adaptive threshold for the first class.

Further to the second embodiments, the unit comprises an intra unit and the processor is further to classify the intra unit into a first class of multiple classes and to generate a quantization parameter based adaptive threshold for each of the multiple classes, wherein the adaptive transform unit split threshold comprises the quantization parameter based adaptive threshold for the first class, wherein the multiple classes comprise at least one of a sharp edge content class or a texture block class.

Further to the second embodiments, the unit comprises an intra unit and the processor is further to classify the intra unit into a first class of multiple classes and to generate a quantization parameter based adaptive threshold for each of the multiple classes, wherein the adaptive transform unit split threshold comprises the quantization parameter based adaptive threshold for the first class, wherein the multiple classes consist of a sharp edge content class, a texture content class, and a remainder class.

Further to the second embodiments, the unit comprises an intra unit and the processor is further to classify the intra unit into a first class of multiple classes and to generate a quantization parameter based adaptive threshold for each of the multiple classes, wherein the adaptive transform unit split threshold comprises the quantization parameter based adaptive threshold for the first class, wherein the multiple classes consist of a sharp edge content class, a texture content class, and a remainder class, and the processor to classify the intra unit comprises the processor to classify the intra unit into the sharp edge content class when the intra unit is screen content, to classify the intra unit into the remainder class when a variance of the intra unit is less than a first threshold, to classify the intra unit into the sharp edge content class when a minimum sub-unit variance is less than a second threshold and less than a first predetermined percentage of the variance of the intra unit, to classify the intra unit into the texture content class when the minimum sub-unit variance is greater than a second predetermined percentage of a maximum sub-unit variance or when the minimum sub-unit variance is greater than a third threshold, and to classify the intra unit into the sharp edge content class when the variance of the intra unit is greater than a fourth threshold.

Further to the second embodiments, the unit comprises an inter unit and the processor is further to perform inter analysis on the inter unit to detect excessive motion corresponding to the inter unit, wherein the processor to compare each prediction residue is responsive to no excessive motion being detected.

Further to the second embodiments, the unit comprises an inter unit and the processor is further to perform inter analysis on the inter unit to detect excessive motion corresponding to the inter unit, wherein the processor to compare each prediction residue is responsive to no excessive motion being detected, wherein the processor to compare each prediction residue is further responsive to the inter unit being larger than 8×8 pixels.

Further to the second embodiments, the processor is further to perform an inter analysis of a second unit of the video to detect motion blur or random motion corresponding to the second unit, wherein the second unit comprises an inter unit, and to provide a single transform unit for the second unit responsive to the second unit having at least one of motion blur or random motion, wherein the single transform unit corresponds to a prediction unit size corresponding to the second unit.

Further to the second embodiments, the processor is further to compare, for at least a first transform unit of the multiple transform units, individual prediction residues of the first transform unit to a second threshold and to split the first transform unit based on a first prediction residue of the first transform unit exceeding the second threshold.

Further to the second embodiments, the bitstream comprises at least one of a high efficiency video coding (HEVC) compliant bitstream or a VP9 compliant bitstream.

In one or more third embodiments, a system comprises means for comparing individual prediction residues of a unit of a picture of video to an adaptive transform unit split threshold corresponding to the unit, means for providing multiple transform units for coding the unit based on the comparison of each prediction residue to the adaptive threshold, and means for coding the picture of the video based at least in part on the multiple transform units to generate a bitstream including the coded picture.

Further to the third embodiments, the means for providing the multiple transform units comprise means for performing a transform unit split of a transform unit corresponding to the unit responsive to any one of the prediction residues of the unit exceeding the adaptive transform unit split threshold.

Further to the third embodiments, the system further comprises means for comparing individual second prediction residues of a second unit of the video to a second adaptive transform unit split threshold corresponding to the second unit and means for providing a single transform unit for the second unit responsive to all of the second prediction residues not exceeding the adaptive transform unit split threshold, wherein the single transform unit corresponds to at least one of a coding unit size or a prediction unit size corresponding to the second unit.

Further to the third embodiments, the unit comprises an intra unit and the system further comprises means for classifying the intra unit into a first class of multiple classes and means for generating a quantization parameter based adaptive threshold for each of the multiple classes, wherein the adaptive transform unit split threshold comprises the quantization parameter based adaptive threshold for the first class.

Further to the third embodiments, the unit comprises an inter unit and the system further comprises means for performing inter analysis on the inter unit to detect excessive motion corresponding to the inter unit, wherein said comparing each prediction residue is performed responsive to no excessive motion being detected.

Further to the third embodiments, the system further comprises means for performing an inter analysis of a second unit of the video to detect motion blur or random motion corresponding to the second unit, wherein the second unit comprises an inter unit and means for providing a single transform unit for the second unit responsive to the second unit having at least one of motion blur or random motion, wherein the single transform unit corresponds to a prediction unit size corresponding to the second unit.

In one or more fourth embodiments, at least one machine readable medium comprises a plurality of instructions that, in response to being executed on a computing device, cause the computing device to perform video coding by comparing individual prediction residues of a unit of a picture of video to an adaptive transform unit split threshold corresponding to the unit, providing multiple transform units for coding the unit based on the comparison of each prediction residue to the adaptive transform unit split threshold, and coding the picture of the video based at least in part on the multiple transform units to generate a bitstream including the coded picture.

Further to the fourth embodiments, providing the multiple transform units comprises performing a transform unit split of a transform unit corresponding to the unit responsive to any one of the prediction residues of the unit exceeding the adaptive transform unit split threshold.

Further to the fourth embodiments, the machine readable medium further comprises a plurality of instructions that, in response to being executed on the computing device, cause the computing device to perform video coding by comparing individual second prediction residues of a second unit of the video to a second adaptive transform unit split threshold corresponding to the second unit and providing a single transform unit for the second unit responsive to all of the second prediction residues not exceeding the adaptive transform unit split threshold, wherein the single transform unit corresponds to at least one of a coding unit size or a prediction unit size corresponding to the second unit.

Further to the fourth embodiments, the unit comprises an intra unit and the machine readable medium further comprises a plurality of instructions that, in response to being executed on the computing device, cause the computing device to perform video coding by classifying the intra unit into a first class of multiple classes and generating a quantization parameter based adaptive threshold for each of the multiple classes, wherein the adaptive transform unit split threshold comprises the quantization parameter based adaptive threshold for the first class.

Further to the fourth embodiments, the unit comprises an inter unit and the machine readable medium further comprises a plurality of instructions that, in response to being executed on the computing device, cause the computing device to perform video coding by performing inter analysis on the inter unit to detect excessive motion corresponding to the inter unit, wherein said comparing each prediction residue is performed responsive to no excessive motion being detected.

Further to the fourth embodiments, the machine readable medium further comprises a plurality of instructions that, in response to being executed on the computing device, cause the computing device to perform video coding by performing an inter analysis of a second unit of the video to detect motion blur or random motion corresponding to the second unit, wherein the second unit comprises an inter unit and providing a single transform unit for the second unit responsive to the second unit having at least one of motion blur or random motion, wherein the single transform unit corresponds to a prediction unit size corresponding to the second unit.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for video coding comprising:
a memory to store a picture of video; and
a processor coupled to the memory, the processor to compare each individual prediction residue of a unit of the picture of video to an adaptive transform unit split threshold corresponding to the unit, to provide multiple transform units for coding the unit in response to any individual prediction residue of the unit exceeding the adaptive transform unit split threshold or to provide a single transform unit for the unit in response to every individual prediction residue of the unit not exceeding the adaptive transform unit split threshold, and to code the picture of the video based at least in part on the multiple transform units or the single transform unit to generate a bitstream including the coded picture.

2. The system of claim 1, the processor to provide the multiple transform units comprises the processor to perform a transform unit split of a transform unit corresponding to the unit and the single transform unit corresponds to at least one of a coding unit size or a prediction unit size of the unit.

3. The system of claim 1, wherein the processor is further to, in response to the any individual prediction residue of the unit exceeding the adaptive transform unit split threshold, compare, for at least a first transform unit of the multiple transform units, each individual prediction residue of the first transform unit to the adaptive transform unit split threshold or a second threshold and to split the first transform unit in response to any individual prediction residue of the first transform unit exceeding the adaptive transform unit split threshold or the second threshold.

4. The system of claim 1, wherein each individual prediction residue of the first transform unit is compared to the second threshold and the second threshold is greater than the adaptive transform unit split threshold.

5. The system of claim 1, wherein the bitstream comprises at least one of a high efficiency video coding (HEVC) compliant bitstream or a VP9 compliant bitstream.

6. At least one non-transitory machine readable medium comprising a plurality of instructions that, in response to being executed on a computing device, cause the computing device to perform video coding by:
comparing each individual prediction residue of a unit of a picture of video to an adaptive transform unit split threshold corresponding to the unit;
providing multiple transform units for coding the unit in response to any individual prediction residue of the unit exceeding the adaptive transform unit split threshold or providing a single transform unit for the unit in response to every individual prediction residue of the unit not exceeding the adaptive transform unit split threshold; and
coding the picture of the video based at least in part on the multiple transform units or the single transform unit to generate a bitstream including the coded picture.

7. The non-transitory machine readable medium of claim 6, wherein providing the multiple transform units comprises performing a transform unit split of a transform unit corresponding to the unit and the single transform unit corresponds to at least one of a coding unit size or a prediction unit size of the unit.

8. The non-transitory machine readable medium of claim 6, further comprising a plurality of instructions that, in response to being executed on the computing device and in response to the any individual prediction residue of the unit exceeding the adaptive transform unit split threshold, cause the computing device to perform video coding by:
comparing, for at least a first transform unit of the multiple transform units, each individual prediction residue of the first transform unit to the adaptive transform unit split threshold or a second threshold; and
splitting the first transform unit in response to any individual prediction residue of the first transform unit exceeding the adaptive transform unit split threshold or the second threshold.

9. The non-transitory machine readable medium of claim 6, wherein each individual prediction residue of the first transform unit is compared to the second threshold and the second threshold is greater than the adaptive transform unit split threshold.

10. The non-transitory machine readable medium of claim 6, wherein the bitstream comprises at least one of a high efficiency video coding (HEVC) compliant bitstream or a VP9 compliant bitstream.

11. A system for video coding comprising:
a memory to store a picture of video; and
a processor coupled to the memory, the processor to classify an intra unit of the picture of video into a first class of multiple classes, wherein a quantization parameter based adaptive threshold corresponds to each of the multiple classes, to compare individual prediction residues of the intra unit to an adaptive transform unit split threshold corresponding to the unit, wherein the adaptive transform unit split threshold comprises the quantization parameter based adaptive threshold for the first class, to provide multiple transform units for coding the unit based on the comparison of each prediction residue to the adaptive transform unit split threshold, and to code the picture of the video based at least in part on the multiple transform units to generate a bitstream including the coded picture.

12. The system of claim 11, wherein the multiple classes comprise at least one of a sharp edge content class or a texture block class.

13. The system of claim 11, wherein the multiple classes comprise a sharp edge content class, a texture content class, and a remainder class.

14. The system of claim 13, wherein the processor to classify the intra unit comprises the processor to classify the intra unit into the sharp edge content class when the intra unit is screen content, to classify the intra unit into the remainder class when a variance of the intra unit is less than a first threshold, to classify the intra unit into the sharp edge content class when a minimum sub-unit variance is less than a second threshold and less than a first predetermined percentage of the variance of the intra unit, to classify the intra unit into the texture content class when the minimum sub-unit variance is greater than a second predetermined percentage of a maximum sub-unit variance or when the minimum sub-unit variance is greater than a third threshold, and to classify the intra unit into the sharp edge content class when the variance of the intra unit is greater than a fourth threshold.

15. The system of claim 11, wherein the processor to provide the multiple transform units comprises the processor to perform a transform unit split of a transform unit corresponding to the unit responsive to any one of the prediction residues of the unit exceeding the adaptive transform unit split threshold.

16. The system of claim 11, wherein the bitstream comprises at least one of a high efficiency video coding (HEVC) compliant bitstream or a VP9 compliant bitstream.

17. A system for video coding comprising:
a memory to store a picture of video; and
a processor coupled to the memory, the processor to compare individual prediction residues of a unit of the picture of video to an adaptive transform unit split threshold corresponding to the unit, to provide multiple transform units for coding the unit based on the comparison of each prediction residue to the adaptive transform unit split threshold, to perform an inter analysis of an inter unit of the video to detect motion blur or random motion corresponding to the inter unit, to provide a single transform unit for the inter unit responsive to the inter unit having at least one of motion blur or random motion, wherein the single transform unit corresponds to a prediction unit size corresponding to the inter unit, and to code the picture of the video based at least in part on the multiple transform units and the single transform unit to generate a bitstream including the coded picture.

18. The system of claim 17, wherein the processor to provide the multiple transform units comprises the processor to perform a transform unit split of a transform unit corresponding to the unit responsive to any one of the prediction residues of the unit exceeding the adaptive transform unit split threshold.

19. The system of claim 17, the processor further to compare individual second prediction residues of a second unit of the video to a second adaptive transform unit split threshold corresponding to the second unit and to provide a second single transform unit for the second unit responsive to all of the second prediction residues not exceeding the adaptive transform unit split threshold, wherein the second single transform unit corresponds to at least one of a coding unit size or a prediction unit size of the second unit.

20. The system of claim 17, the processor further to compare, for at least a first transform unit of the multiple transform units, individual prediction residues of the first transform unit to a second threshold and to split the first transform unit based on a first prediction residue of the first transform unit exceeding the second threshold.

21. The system of claim 17, wherein the bitstream comprises at least one of a high efficiency video coding (HEVC) compliant bitstream or a VP9 compliant bitstream.

* * * * *